United States Patent
Lortz et al.

(10) Patent No.: US 6,418,486 B1
(45) Date of Patent: Jul. 9, 2002

(54) DEVICE HANDLING SYSTEM AND METHOD

(75) Inventors: Victor B. Lortz, Beaverton; Jonathan G. Ritchie, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/362,196

(22) Filed: Jul. 28, 1999

(51) Int. Cl.[7] .............................................. G06F 13/00
(52) U.S. Cl. ......................... 710/10; 710/104; 709/217
(58) Field of Search ........................ 710/8–14, 15–19, 710/104; 709/217–219, 220–222, 321, 327

(56) References Cited

U.S. PATENT DOCUMENTS

| | | | | |
|---|---|---|---|---|
| 5,796,602 A | * | 8/1998 | Wellan et al. ............... 364/130 |
| 5,892,904 A | * | 4/1999 | Atkinson et al. ............ 713/201 |
| 6,041,364 A | * | 3/2000 | Lortz et al. .................. 709/301 |
| 6,094,600 A | * | 7/2000 | Sharpe, Jr. et al. ........... 700/19 |
| 6,354,294 B1 | * | 2/2001 | O'Toole et al. ............. 709/222 |
| 6,263,379 B1 | * | 7/2001 | Atkinson et al. ............ 709/332 |

* cited by examiner

Primary Examiner—Christopher B. Shin
(74) Attorney, Agent, or Firm—Kenyon & Kenyon

(57) ABSTRACT

A system and method for distributing software needed to enable a device coupled to a computer to provide a desired functionality. Static information called a moniker is embedded in the device, and a generic device handler software is installed on the computer. When the device is coupled to the computer, the generic device handler software is executed by the computer to interpret the moniker to identify the software needed to enable the device, determine the enabling software's location, and install it, if necessary. The generic handler software and/or the enabling software performs any further action needed by the device or computer to provide or utilize, respectively, the functionality of the device.

26 Claims, 4 Drawing Sheets

DEVICE HANDLING SYSTEM AND METHOD

BACKGROUND OF THE INVENTION

This invention is directed to managing the interaction between a peripheral device such as a printer, an external disk drive, or a networked appliance and a computer to which it is coupled. In particular, the present invention uses a generic software to interpret static information stored at the device to enable the device to communicate with the computer, with other devices, and with remote sites with which it may communicate through a network.

As used herein, a "device" is hardware (that can include software) that provides some useful functionality when coupled to a computer. Examples of a device include a printer, a scanner, a modem, a home security system, a television, a light switch and a telephone. In the process of providing useful functionality, the device communicates with the computer, and/or with other devices also coupled to the same or another computer, and/or with remote sites with which the device is coupled, e.g., through a network. As used herein, the term "coupled" means directly or indirectly connected. Thus, A is coupled to B is A is directly connected to B. A is also coupled to B if A is directly connected to C, and C is directly connected to B.

One type of computer includes a microprocessor, such as the Pentium III microprocessor manufactured by the Intel Corporation of Santa Clara, California; a memory, such as read only memory (ROM), random access memory (RAM), a hard disk, etc., or any combination thereof; and a port through which the microprocessor communicates with the device and/or other sites (e.g., through a network). Examples of a computer include a Dell XPS T microcomputer and an Apple Macintosh computer. Another type of computer includes an Application Specific Integrated Circuit (ASIC) that is designed in hardware and firmware to perform certain specific tasks. An example of an ASIC is a digital signal processor.

A remote site can include a device and/or a computer. A device communicates with another entity (computer, other device, remote site) that executes a software application. Examples of software applications include a word processor, a home automation software package, a telecommunications software package, an Internet telephone program, a home intrusion detection and prevention program, and a control program for a television. When an application calls for functionality provided by a device, the application can send a message to the device, e.g., requesting a service ("turn on the light", "alert the police department", "print this document", etc.) The device can send also send a message to the application, e.g., "I am ready", "send the document", "the light has been turned on", etc. Thus, an application and a device can communicate with each other, provided the computer on which the application is run and the device are somehow coupled. In many cases, the application and the device communicate with each other through an operating system, such as the LINUX operating system (described at <www.linux.com>, visited Jul. 8, 1999), or the Windows 98 operating system made by the Microsoft Corporation. The operating system is an "intermediate application" that operates between the device and the "end application" that provides the ultimate functionality to the user, e.g., a word processing program, a home device control program, etc. As used herein, the term "application" can refer to either an intermediate application, such as an operating system, or to an end application.

Computers, applications and devices are often not manufactured by the same entity. Devices made by different manufacturers have distinct command sets for providing services. Thus, printers made by different manufacturers can have different command sets for receiving and printing a document from an application. Likewise, applications from different manufacturers can send requests for services to devices in different formats. For example, one word processor can send a document to a printer in a first format, while a second word processor made by a different manufacturer can send a document with the same content to a printer in an entirely different format. In short, different applications "speak" different languages, and different devices also "speak" different languages. Thus, communication between applications and devices can be problematic.

A known solution to this problem is to use a piece of software called a "driver" to translate communications from a given application to a format that can be understood by a particular device, and vice versa. For example, a printer driver is made that translates print commands between the WordPerfect word processor, made by the Corel Corporation, and the Hewlett Packard Deskjet 520 color printer, made by the Hewlett Packard company. Typically, a driver is specific to the computer and operating system with which the device is to be used.

The diversity in both applications and devices has resulted in the proliferation of drivers, making it more complex and difficult to properly distribute and maintain them. A known distribution model is to include every driver a user may conceivably require at any time along with the operating system that is included with a computer when it is shipped to a user. This is inefficient, as it almost invariably means including thousands of drivers that the user does not and will never need. It is also practically impossible to include a complete set, because there is an unavoidable lag between the time a new device becomes available and the operating system manufacturer becomes aware of it, receives the appropriate drivers, and is able to include them in with the operating system. Thus, the user is faced with the prospect of not having available a driver for a new device she couples to her computer. Likewise, the problem of getting new drivers that are produced after the computer is shipped to the user persists. Periodic updates (e.g., over the Internet) are possible, but cumbersome and inefficient.

Drivers can become outdated. Just like most software, improvements can be made to a driver, and successive versions can be released by the device manufacturer. Distributing these to users can be logistically difficult, if not impossible, as the manufacturer has no mechanism for easily distributing updated drivers after the device is purchased. One known solution to this problem is to include special installation software for a particular device on a computer that would automatically execute when it detected that the device was coupled to the computer. The special installation software includes information about the computer and about the device, and installs the correct driver (and possibly other applications) automatically, in some cases fetching them from a remote site over the Internet. In one embodiment, the special installation software uses a Uniform Resource Locator stored at the device to obtain the driver from a manufacturer page on the World Wide Web through the Internet. This partially solves the problem by providing the manufacturer with means for distributing the latest, most up-to-date version of the correct driver, as well as ancillary applications and components for using the device. But the special installation software is particular to a given device, or set of devices from a certain manufacturer. Thus, a different special installation software program must be included on a computer for each device, or each manufacturer of devices. This is inefficient, and it can be practically impossible to include a complete set of special installation software for all manufacturers of all devices a user may wish to install at any time. Further, this solution is difficult to maintain, i.e., it provides no easy way to enable communications between applications and devices for computers that have already been shipped to users without any or all of the specific installation software already installed. Ideally, a user should be able to obtain a correct, up-to-date driver for practically any device when the device is coupled to the user's computer, without requiring installation software specific to that device to be already installed on the computer.

SUMMARY OF THE INVENTION

In accordance with an embodiment of the present invention, the functionality of a device coupled to a computer is enabled by extracting a moniker information stored in the device. At least part of the moniker information is interpreted to determine if a custom handler is installed at the computer. If a custom handler is not installed at the computer, then at least part of the moniker information is interpreted to identify the location of a custom handler. The custom handler is installed, and a custom handler action is performed.

DETAILED DESCRIPTION

The present invention provides a generic piece of software called a generic device handler that extracts information called a moniker string that is embedded in a device, interprets the string to determine what action is needed to enable the device to communicate with another entity (e.g., a computer, another device, etc.), and to perform, or assist another entity to perform, the determined action. This advantageously permits a single piece of software to be distributed with computers that can enable communications with any device that has an embedded moniker string. This generic handling software can advantageously be distributed, e.g., online, through the mail on a diskette or Compact Disk Read Only Memory (CD-ROM), to computers that have already been sold and shipped without the generic handling software.

Figure 1:
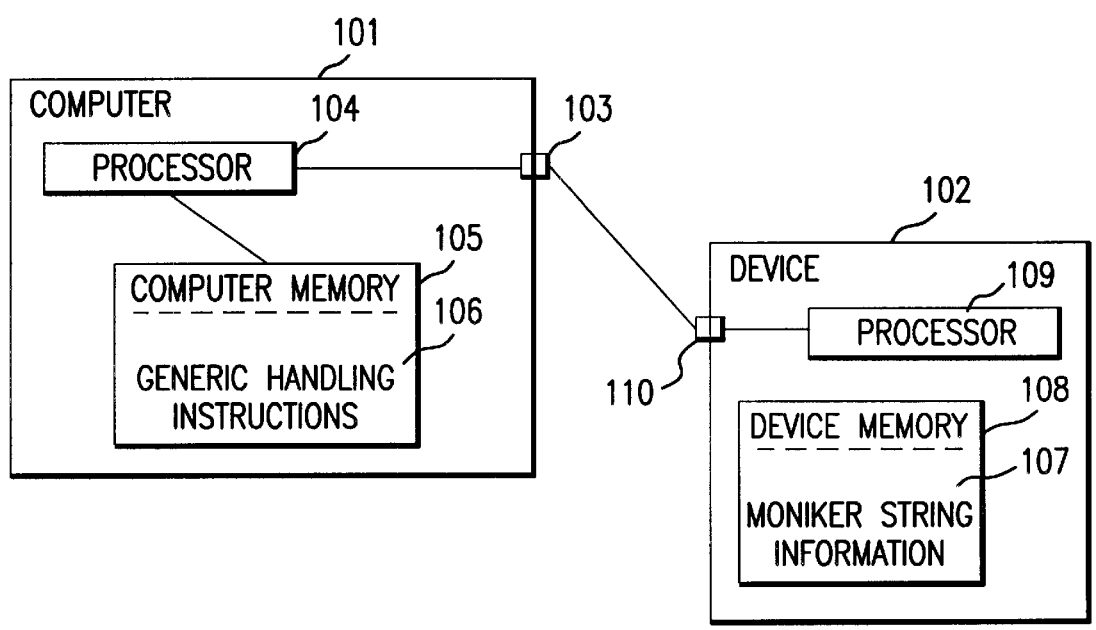
FIG. 1 shows a system in accordance with an embodiment of the present invention.

A system in accordance with the present invention is shown in FIG. 1. A computer 101 is coupled to device 102 through computer port 103. Computer port 103 is coupled to computer processor 104, which can be a general purpose microprocessor (e.g., an Intel Pentium III microprocessor) or an ASIC, or a combination thereof. Computer processor 104 is coupled to computer memory 105 storing generic handling instructions 106. Generic handling instructions 106 are adapted to be executed by computer processor 104 to perform the method in accordance with an embodiment of the present invention. For example, generic handling instructions 106 are adapted to be executed by computer processor 104 to extract moniker string information 107 from device 102, interpret the moniker string information to determine what action is necessary to enable device 102 to communicate, and then to perform the determined action. In an embodiment that includes an ASIC, at least part of the functionality of the generic handling instructions 106 are designed into the hardware and firmware of the ASIC, so that the ASIC embodies in hardware and firmware at least part of the method in accordance with the present invention.

The moniker string information 107 is stored in device memory 108. Typically, device 102 also includes a device processor 109 and device port 110 through which device 102 communicates. Device memory 108 and device port 110 are coupled to device processor 109. Device processor 108 can be a general purpose microprocessor or an ASIC. Device memory can also store device instructions (not shown) adapted to be executed by device processor 109. In one embodiment, device instructions are stored in device Read Only Memory. In another embodiment, device instructions are downloaded externally as they are needed from some external source (e.g., a computer, another device, etc.)

Computer memory 105 and device memory 108 can include any mechanism adapted to store digital information, such as Random Access Memory (RAM), Read Only Memory (ROM), a hard disk, a CD-ROM, flash memory, etc., or a combination thereof. At least part of the memory should be both writeable and readable.

Figure 2:
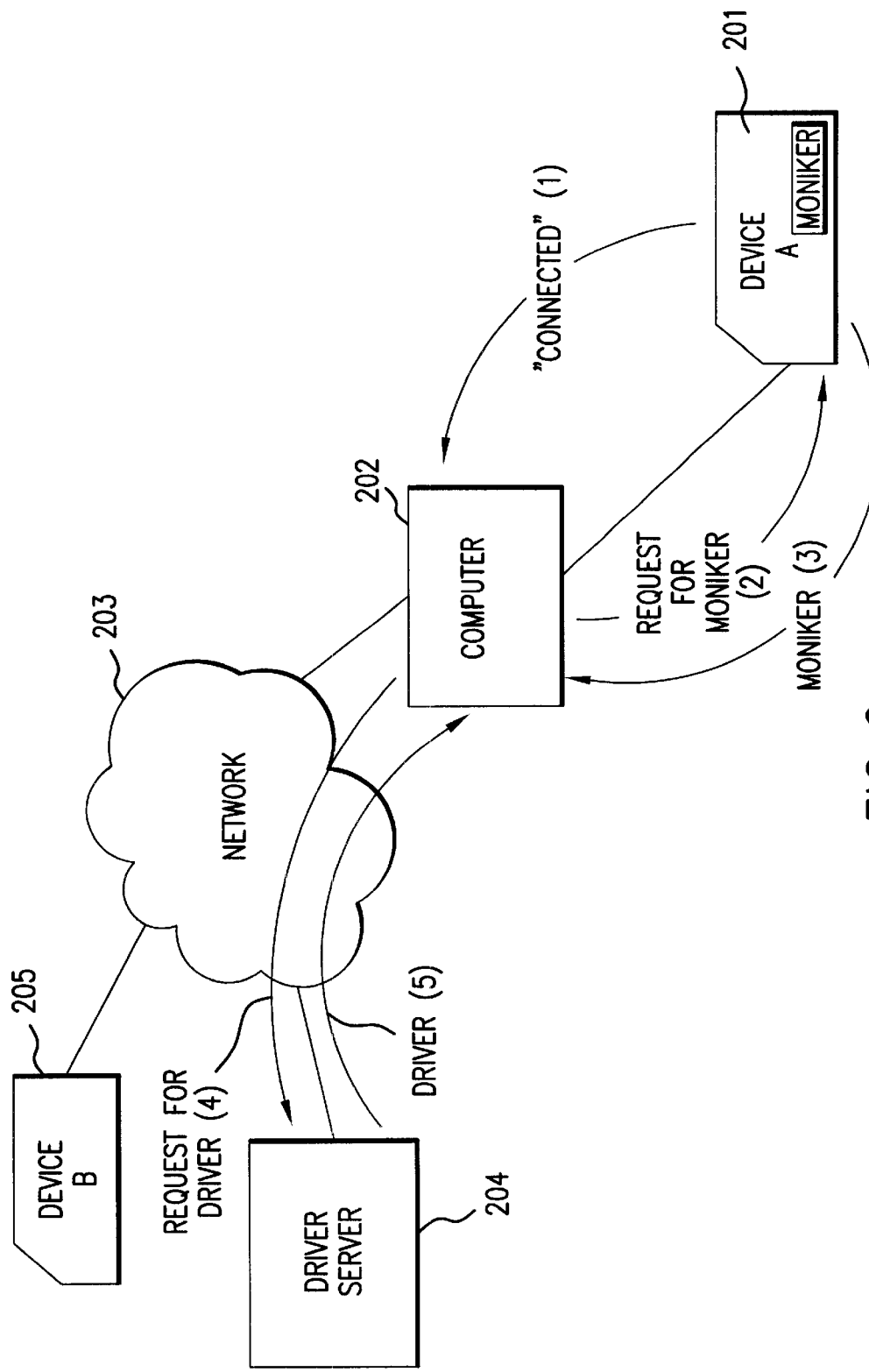
FIG. 2 shows a system in accordance with another embodiment of the present invention.

Another embodiment of a system in accordance with the present invention is shown in FIG. 2. Device A 201 is coupled to a computer 202, which is in turn coupled to a network 203. A driver server 204 and device B 205 is also coupled to the network 203. The driver server 204 is a computer that stores a library of device drivers. In accordance with an embodiment of the present invention, computer 202 executes generic handling instructions that extract moniker information from device A 201 and determine that there is no driver for device A 201 stored locally at computer 202. In accordance with the method of an embodiment of the present invention, the computer 202 determines from the moniker information the network address of a server that stores the appropriate driver for device A 201, which is the network address of driver server 204. Computer 202 then sends a message to driver server 204 through network 203, requesting that driver server 204 send a copy of a driver for device A 201 to computer 202. In response, driver server 204 sends the driver, which is received and installed locally by computer 202. Computer 202 is then able to communicate with device A.

In another embodiment of the present invention, computer 202 extracts moniker information from device A 201 and determines that a special piece of software called a "custom handler" must be installed locally at computer 202 in order to enable device A to provide a desired functionality. In the embodiment shown in FIG. 2, device A 201 sends a message (1) indicating it is connected to computer 202 when device A 201 is first coupled to computer 202. In response, computer 202 sends a message (2) asking for the moniker to device A 201. Device A 201 then sends the moniker in a message (3) to computer 202.

Computer 202 determines if the custom handler identified in the moniker information is installed locally. If the correct custom handler is not locally installed, computer 202 uses the moniker information to identify the location of a custom handler, e.g., obtains the network address of driver server 204, at which the appropriate custom handler is stored. In another embodiment, the custom handler is stored, but not installed, locally at computer 202. In yet another embodiment, computer 202 determines that the custom handler is located at remote device B 205. After determining at least one location of the custom handler, computer 202 fetches it (if necessary) and installs it locally. In the embodiment shown in FIG. 2, computer 202 25 sends to driver server 204 a message (4) requesting the driver. It is advantageous for computer 202 to include information about the operating system installed on computer 202 as a part of the message (4) requesting the driver. In response, driver server 204 sends the requested driver (or family of drivers) (5) to computer 202.

Installing the custom handler means loading custom handler at computer 202 such that the loaded custom handler instructions can be executed by the computer's processor. The custom handler is then executed at computer 202 to perform a custom handler action. Examples of a custom handler action include installing on computer 202 a driver for device A 201; storing and/or sending status information pertaining device A 201 from computer 202 to a remote site (such as driver server 204); copying instructions adapted to be executed by computer 202 from a first memory to a second memory; requesting new device software (e.g., a driver or family (set) of drivers, software executed by the device to provide functionality,. static information adapted to be stored in the device, device monitoring software that detects and reports a failure of the device, device monitoring software that diagnoses maintenance requirements of the device, etc.) from a remote site, receiving the new device software from the remote site, and installing the new device software at computer 202; and otherwise configuring computer 202 to enable device A to provide a service or other desired functionality.

Moniker information is typically static information that occurs as a string stored in the memory of a device. Moniker information in accordance with an embodiment of the present invention can identify a property of the device in which the moniker string is stored; include a device identifier (e.g., a device serial number, model number, version number, etc.); identify a protocol useful for communicating with the device; include a cryptographic key; etc. The moniker information stored in the device can include any information useful in enabling the device to communicate with other devices and/or computers, and to provide services and functionality.

Moniker information that is stored in a device is interpreted to determine the appropriate action needed to enable the device's functionality. In one embodiment of the present invention, the moniker is interpreted by parsing it to distinguish a first discrete subpart that specifies a first location for a custom handler. Next, it is determined if an appropriate custom handler is available at the specified first location. If such a custom handler is not available at the specified first location, then the moniker information (e.g., a string) is further parsed to distinguish a second discrete subpart of the moniker that specifies a second location for the custom handler. It is then determined if the custom handler is available at the second location. If so, it is fetched and/or installed. In this way, the present invention advantageously provides a robust mechanism for finding and installing the software needed to render a device functional.

Moniker information can include a Uniform Resource Locator in accordance with an embodiment of the present invention. For example, a moniker can include the URL of a device manufacturer's web site on the Internet at which software (e.g., a driver, a custom handler, device software, software maintenance/update/upgrade patches, etc.) needed to enable the device to provide a functionality is stored. In another embodiment, the moniker string includes a cryptographic key that is used to authenticate any requests from a computer that has interpreted the string, and/or to encrypt or otherwise protect the confidentiality and/or integrity of communications pertaining to the device.

An example of a moniker is as follows:

Acme: Device_Name="Thermotron" Model_No. ="23928-A" www.acme.com/thermotron/models/ 23000.drv;Attributes: PubKey="1278927" Ser._No.= "3890237ASD232";

"Acme" signifies the manufacturer of the device, which computer 202 can use, along with the device name ("thermotron") and model number "23928-A") to determine if the driver for the device is already installed locally. If it is not installed locally, computer 202 uses the information in the next segment of the moniker ("www.acme.com/ thermotron/models/23000.drv") to locate the driver, or a family of drivers. In this example, this segment of the moniker is a URL that specifies the address ("www.acme.com") of a driver server 204, and the location of a file ("/thermotron/models/23000.drv") that contains the appropriate driver at the driver server 204. The next segment of the moniker, labeled "Attributes," includes information useful for different applications. For example, the first attribute is a public key("pubKey=1278927", although an actual public key would be much longer) used in a public key cryptosystem such as the Diffie-Hellman and RSA cryptosystems known in the art and described in *Applied Cryptography*, by Bruce Schneier, 2d Ed., John Wiley 1996, Chapters 19 and 22. In one embodiment, the public key is used to encrypt information sent from computer 202 to device A 201, helping to ensure that this information is not modified by an unauthorized third party, or that device A 201 is spoofed by an unauthorized third party. For this purpose, device A also contains a private key that corresponds to the public key. The private key can be used to decrypt messages encrypted using the public key, sign certificates to authenticate a message from the device, etc. A serial number ("Ser._No.="3890237ASD232") can also be a part of the moniker. The serial number is useful in numerous applications, including rights management, i.e., enforcing a policy that determines if device A 201 can access, modify, play, copy and/or distribute a given piece of digital data, such as a song or a movie. This can be used in conjunction with the public key material in the moniker. For example, a song can be played by a player device only if the player device has been granted permission to play it from a remote server. In order to play the song, the device's serial number is sent to the remote server along with a payment. The remote server sends a play permission certificate that is based upon the device's serial number, and is signed with the device's public key. The device receives the certificate, authenticates it by checking the signature using its private key, and then plays the song in accordance with any limitations in the certificate (e.g., one-play only, play at medium quality only, etc.) The semicolon (";") is used to delimit one segment of the moniker from another segment.

Figure 3:
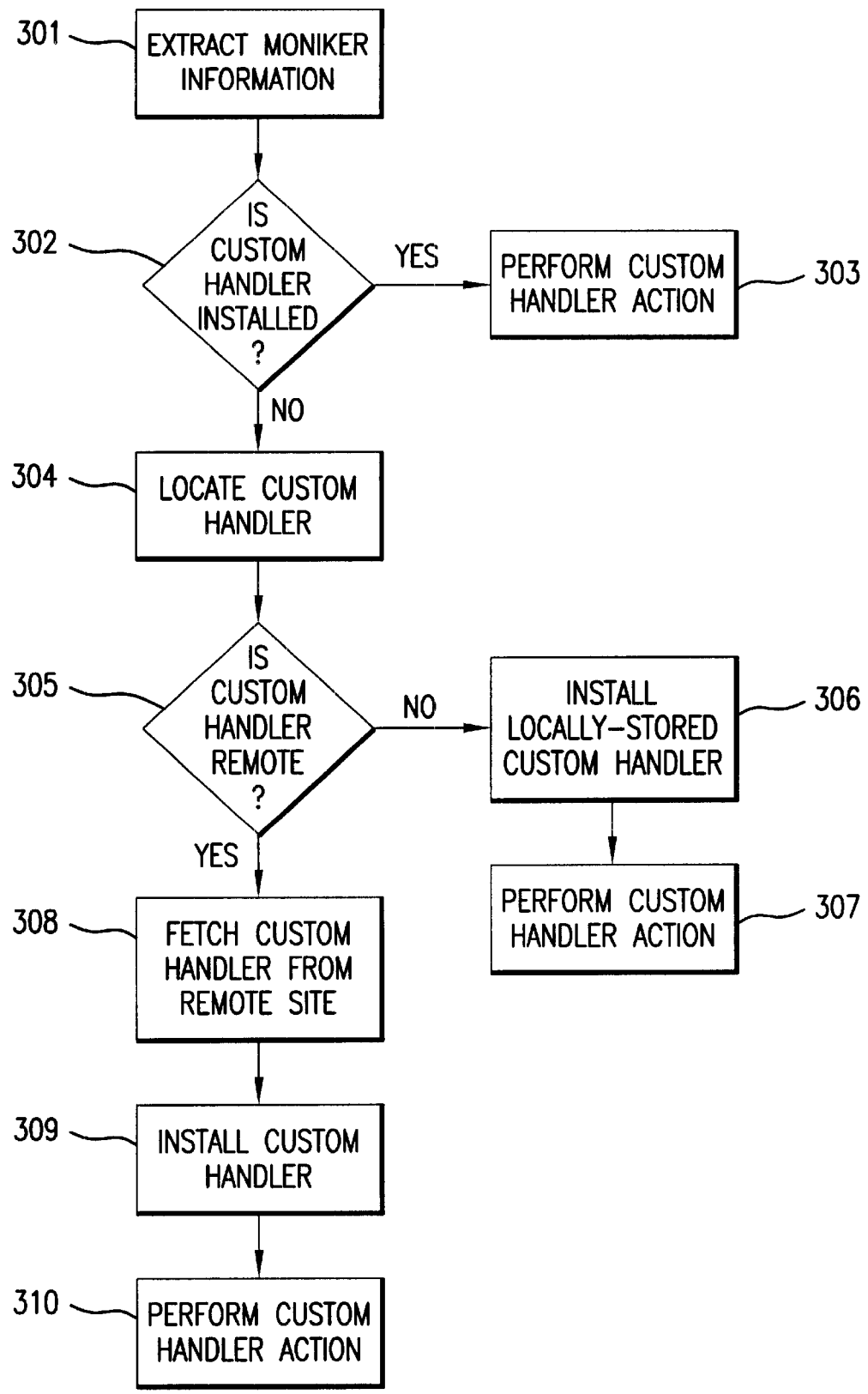
FIG. 3 shows a flow chart depicting the method in accordance with an embodiment of the present invention.

The method in accordance with an embodiment of the present invention is shown in the flow chart of FIG. 3. A computer extracts moniker information, step 301, and interprets it to determine if a custom handler is installed, step 302. In one embodiment, this is done by extracting the name of the custom handler needed from the moniker, and then searching a directory of custom handlers that are presently installed on the computer. If a custom handler is already locally installed, then a custom handler action in performed, step 303 (e.g., installing a driver for the device from which the moniker information was extracted). If a custom handler is not already locally installed, then the moniker information is further interpreted to determine a location from which a custom handler can be obtained, step 304. It is determined if the location of the custom handler is remote, step 305. If the location is not remote, then the custom handler is installed from where it is stored locally, step 306. The custom handler may be stored on the computer's hard disk, for example, yet not be installed before step 305. Then a custom handler action is performed, step 307. If the custom handler is remote, then it is fetched from the remote site, step 308, and then installed locally, step 309. A custom handler action is then performed, step 310.

Figure 4:
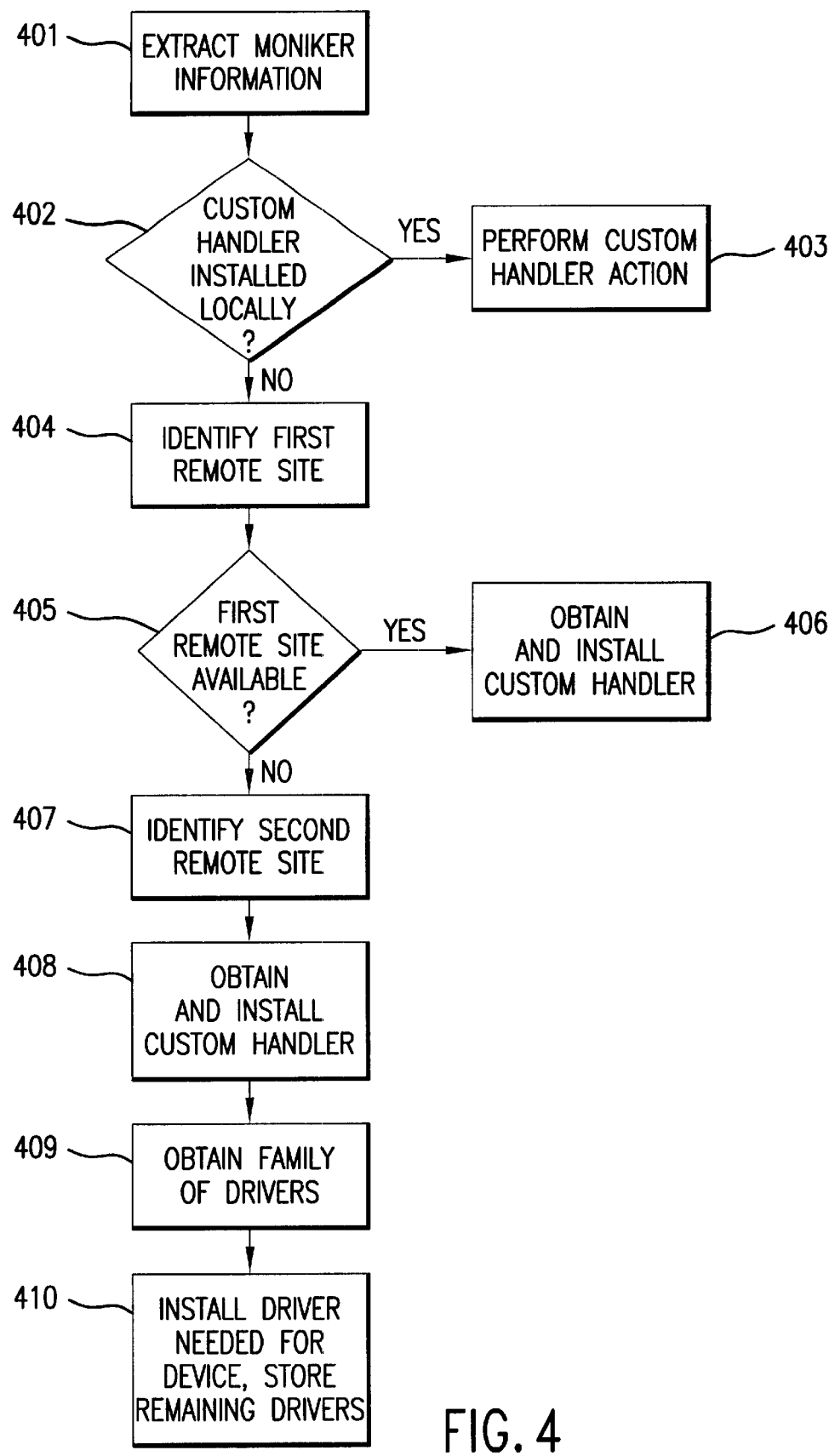
FIG. 4 shows a flow chart depicting the method in accordance with another embodiment of the present invention.

Another method in accordance with an embodiment of the present invention is shown in FIG. 4. Moniker information is extracted by a computer from a device coupled to the computer, step 401. The computer determines if a custom handler for the device is presently installed locally, step 402. If it is installed locally, the computer performs a custom handler action, step 403. The computer interprets the moniker information to obtain a first remote location from which the custom handler can be obtained, step 404, and sends a message thereto. The computer determines if the first site is available, step 405. If the first site is available, the computer receives from the first site the custom handler and installs it, step 406. If the first remote site is unavailable, e.g., due to network congestion, server problems at the first remote site, etc., the computer further interprets the moniker information to obtain the location of a second site from which the custom handler can be obtained, step 407. The computer sends a request message to the second site, which sends a custom handler to the computer, which, upon receiving it, installs it locally, step 408. The custom handler obtains a family of drivers from a third remote site for the device, step 409, determines which driver of the family needs to be installed, installs it and stores the rest locally, step 410. The rest of the drivers in the family are thereby advantageously locally available should any devices be coupled to the computer in the future that require one of the other drivers from the family. In that case, the custom handler need not fetch the required driver from a remote site over the network, but can simply install the needed driver from local storage (e.g., the computer's hard disk).

The instructions in accordance with an embodiment of the present invention can be distributed to a computer or device by storing the instructions on a medium that is readable by the device. As used herein, a "medium" is anything capable of storing digital information in a form that is readable electronically or optically, including a diskette such as a ZIP disk make by the Iomega Corporation of Roy, Utah, a hard disk, a tape, a CD-ROM, etc. The medium need not be writeable more than once.

The present invention provides an efficient and economical way to distribute software needed to enable a device to provide functionality. Although embodiments are specifically illustrated and described herein, it will be appreciated that modifications and variations of the present invention are covered by the above teachings and within the purview of the appended claims without departing from the spirit and intended scope of the invention.

What is claimed is:

1. A method for enabling the functionality of a device coupled to a computer, including:
 a. extracting moniker information stored in the device;
 b. interpreting at least part of the moniker information to determine if a custom handler is installed at the computer;
 c. if a custom handler is not installed at the computer, then:
  i. interpreting at least part of the moniker information to identify the location of a custom handler;
  ii. installing the custom handler; and
  iii. performing a custom handler action.

2. The method of claim 1, wherein if a custom handler is already installed, then performing a custom handler action.

3. The method of claim 1, wherein the string is stored in the memory of the device.

4. The method of claim 1, wherein the moniker string is adapted to identify a custom handler.

5. The method of claim 1, wherein the moniker string is adapted to identify a property of the device in which the moniker string is stored.

6. The method of claim 1, wherein the moniker string is adapted to provide a device identifier.

7. The method of claim 6, wherein the device identifier is a serial number.

8. The method of claim 6, wherein the device identifier is a model number.

9. The method of claim 1, wherein the moniker string is adapted to identify a protocol for communicating with the device.

10. The method of claim 1, wherein the moniker string includes a cryptographic key.

11. The method of claim 1, wherein the step of interpreting at least part of the moniker string includes the steps of:
 i. parsing the moniker string to distinguish a first discrete subpart of the moniker string that specifies a first location for a custom handler;
 ii. determining if a custom handler is available at the specified first location;
 iii. if a custom handler is not available at the specified first location, then
  a. further parsing the moniker string to distinguish a second discrete subpart of the moniker string that specifies a second location for a custom handler;
  b. determining if the custom handler is available at the second location.

12. The method of claim 1, wherein the step of installing the custom handler comprises the step of configuring the computer to which the device is coupled to execute at least part of the instructions included in the custom handler.

13. The method of claim 1, wherein performing a custom handler action includes the step of installing on the computer a driver for the device to which the computer is coupled.

14. The method of claim 1, wherein performing a custom handler action includes the step of configuring the computer to which the device is coupled to interoperate with the device.

15. The method of claim 1, wherein performing a custom handler action includes the step of copying instructions adapted to be executed by a processor stored at a first memory to a second memory.

16. The method of claim 1, wherein the step of performing a custom handler action includes the steps of sending status information pertaining to the device from the computer to a remote site.

17. The method of claim 1, wherein the step of performing a custom handler action includes the step of storing at the computer status information pertaining to the device.

18. The method of claim 1, wherein the step of performing a custom handler action includes the steps of:
 a. requesting new device software from a remote site;
 b. receiving new device software from the remote site; and
 c. installing at the computer the new device software.

19. The method of claim 18, wherein the new device software includes a driver that enables an application to communicate with the device.

20. The method of claim 18, wherein the new device software includes device monitoring software that detects and reports a failure of the device.

21. The method of claim 18, wherein the new device software is device monitoring software that diagnoses maintenance requirements of the device.

22. The method of claim 1, wherein the step of performing a custom handler action includes the steps of:
   a. requesting a family of drivers from a remote site;
   b. receiving a family of drivers from the remote site;
   c. installing at the computer a driver from the family of drivers.

23. An apparatus for handling a device coupled to a computer, comprising the steps of:
   a. a processor;
   b. a memory that stores device handling instructions adapted to be executed by said processor to extract a moniker string stored in a device, interpreting at least part of the moniker string, determine if there is a custom handler installed based at least partly on the interpretation of the moniker string, and if there is not a custom handler installed, then to interpret at least part of the moniker string to identify the location of a custom handler, install the custom handler and perform a custom handler action, said memory coupled to said processor, said processor coupled to the device.

24. The apparatus of claim 23, further comprising a port adapted to be coupled to a network, said port coupled to said processor.

25. A medium that stores instructions adapted to be executed by a processor to perform steps including:
   a. extracting a moniker string stored in the device;
   b. interpreting at least part of the moniker string to determine if there is a custom handler installed;
      i. if there is not a custom handler installed, then
         a. interpreting at least part of the moniker string to identify the location of a custom handler;
         b. installing the custom handler;
         c. performing a custom handler action.

26. The medium of claim 25, wherein if there is a custom handler installed, then the instructions are adapted to be executed by a processor to perform a custom handler action.

* * * * *